United States Patent
Baratz et al.

(10) Patent No.: US 8,706,888 B2
(45) Date of Patent: Apr. 22, 2014

(54) HIERARCHAL STRUCTURING OF NODES IN A PEER-TO-PEER NETWORK

(75) Inventors: Alan Edward Baratz, Los Altos Hills, CA (US); Anthony Frank Bartolo, Saratoga, CA (US); Jayesh Govindarajan, Sunnyvale, CA (US); Anwar A. Siddiqui, Emeryville, CA (US); John F. Buford, Princeton, NJ (US); Vyankatesh Balaji Deshpande, Pune (IN)

(73) Assignee: Avaya, Inc., Basking Ridge, NJ (US)

( * ) Notice: Subject to any disclaimer, the term of this patent is extended or adjusted under 35 U.S.C. 154(b) by 391 days.

(21) Appl. No.: 12/836,938

(22) Filed: Jul. 15, 2010

(65) Prior Publication Data
US 2011/0093599 A1    Apr. 21, 2011

Related U.S. Application Data

(60) Provisional application No. 61/253,303, filed on Oct. 20, 2009.

(51) Int. Cl.
*G06F 15/16* (2006.01)

(52) U.S. Cl.
USPC ........... 709/228; 709/204; 709/205; 709/206; 709/227

(58) Field of Classification Search
USPC .......................... 709/204, 205, 206, 227, 228
See application file for complete search history.

(56) References Cited

U.S. PATENT DOCUMENTS

| | | |
|---|---|---|
| 6,175,859 B1 | 1/2001 | Mohler |
| 2005/0135335 A1 | 6/2005 | Hession et al. |
| 2006/0052091 A1 | 3/2006 | Onyon et al. |
| 2006/0064461 A1* | 3/2006 | Ludwig et al. ................ 709/204 |
| 2006/0120377 A1 | 6/2006 | Caballero-McCann et al. |
| 2006/0259765 A1* | 11/2006 | Song et al. .................... 713/166 |
| 2006/0265508 A1* | 11/2006 | Angel et al. .................. 709/230 |
| 2007/0047519 A1 | 3/2007 | Bangor et al. |
| 2007/0047700 A1 | 3/2007 | Mohler |
| 2007/0078930 A1* | 4/2007 | Ludwig et al. ................ 709/204 |
| 2007/0110031 A1* | 5/2007 | Szeto ............................ 370/352 |
| 2007/0168426 A1* | 7/2007 | Ludwig et al. ................ 709/204 |
| 2008/0027924 A1 | 1/2008 | Hamilton et al. |

(Continued)

FOREIGN PATENT DOCUMENTS

| | | |
|---|---|---|
| DE | 102006039170 | 2/2008 |
| WO | 2008004207 | 1/2008 |

OTHER PUBLICATIONS

U.S. Appl. No. 61/160,572, filed Mar. 16, 2009.
U.S. Appl. No. 61/163,559, filed Mar. 26, 2009.

(Continued)

*Primary Examiner* — Liangche A Wang

(57) ABSTRACT

A method of operating a communication system comprises registering a plurality of communication devices with a peer-to-peer network as a plurality of enterprise nodes using a plurality of network handles that identify positions in an enterprise hierarchy. The method further comprises receiving a request to establish a session with a participant node and an enterprise node of the plurality of enterprise nodes using a first network handle of the plurality of network handles that identifies a first position in the enterprise hierarchy. In response to the request, the method provides identifying a routing identifier associated with the enterprise node and exchanging user communications for the session with a communication device of the plurality of communication devices registered as the enterprise node using the routing identifier.

20 Claims, 13 Drawing Sheets

(56) References Cited

U.S. PATENT DOCUMENTS

| | | |
|---|---|---|
| 2008/0163075 A1 | 7/2008 | Beck et al. |
| 2010/0162173 A1* | 6/2010 | Schmitlin et al. .............. 715/853 |
| 2010/0260326 A1 | 10/2010 | Michaelis et al. |
| 2011/0075824 A1 | 3/2011 | Geppert et al. |

OTHER PUBLICATIONS

C. Irish; "Web-enabled Call Centre;" BT Technology Journal; Apr. 2000; pp. 65-71; vol. 18; No. 2.

D. Bryan, et al.; "Concepts and Terminology for Peer to Peer SIP;" PSPSIP Working Group, Internet-Draft; Jul. 7, 2008; pp. 1-30; draft-ietf-p2psip-concepts-02.

E. Marocco, et al.; "Interworking between P2PSIP Overlays and Conventional SIP Networks;" Network Working Group, Internet-Draft; Mar. 2, 2007; pp. 1-25; draft-marocco-p2psip-interwork-01.

E. Shim, et al.; "An Architecture for Peer-to-Peer Session Initiation Protocol (P2P SIP);" SIPPING WG, Internet Draft; Feb. 26, 2006; pp. 1-29; draft-shim-sipping-p2p-arch-00.

Timo Toivanen, et al.; "A Study on Interworking between Centralized SIP, P2P-SIP, and PSTN Networks;" May 5, 2006; 7 pages; Helsinki University of Technology; Finland.

\* cited by examiner

HIERARCHAL STRUCTURING OF NODES IN A PEER-TO-PEER NETWORK

RELATED APPLICATIONS

This application is related to and claims priority to U.S. Provisional Patent Application No. 61/253,303, entitled "VoP2P and Hybrid VoIP/VoP2P for Business Persona," filed on Oct. 20, 2009, which is hereby incorporated by reference in its entirety.

TECHNICAL BACKGROUND

In the rapidly changing field of telecommunications, non-traditional phone products are increasing in popularity. Voice over Internet Protocol (VoIP) phone calling is one example that both enterprise class and residential class consumers enjoy in ever larger numbers due to its affordability and features. In addition to voice calling, VoIP products frequently provide chat and video calling capabilities.

While many VoIP products rely on centrally managed network architectures to function, VoIP can be delivered using peer-to-peer (P2P) technologies. A peer-to-peer network, aside from a limited number of root nodes, typically lacks the centralized elements and control of traditional, non-P2P networks. P2P networks can be considered overlay networks that operate at least a layer above an underlying communication network or collection of networks. Skype and Peerio are just two examples of P2P VoIP products among many presently available that provide voice, chat, and video services using peer-to-peer technology.

Initially, the low quality of service of P2P VoIP products dissuaded customers from adopting these services. But over time, the quality of P2P VoIP products has increased sufficiently that they now enjoy widespread acceptance and use by residential and other non-enterprise class consumers. Unfortunately, present P2P VoIP products still have not attracted widespread acceptance by enterprise class consumers to a great extent because they lack many of the features required for enterprise class service.

OVERVIEW

Embodiments disclosed herein include systems and methods for providing an enhanced P2P VoIP experience whereby enterprise nodes on a P2P network are placed in a hierarchal structure. The nodes are identified by handles based on their location within the enterprise hierarchy.

In an embodiment, a method of operating a communication system comprises registering a plurality of communication devices with a peer-to-peer network as a plurality of enterprise nodes using a plurality of network handles that identify positions in an enterprise hierarchy. The method further comprises receiving a request to establish a session with a participant node and an enterprise node of the plurality of enterprise nodes using a first network handle of the plurality of network handles that identifies a first position in the enterprise hierarchy. In response to the request, the method provides identifying a routing identifier associated with the enterprise node and exchanging user communications for the session with a communication device of the plurality of communication devices registered as the enterprise node using the routing identifier.

In another embodiment, a communication system comprises a first enterprise node of a plurality of enterprise nodes using a plurality of network handles that identify positions in an enterprise hierarchy, wherein a plurality of communication devices are registered with a peer-to-peer network as the plurality of enterprise nodes. The first enterprise node is configured to receive a request to establish a session with a participant node and the first enterprise node of the plurality of enterprise nodes using a first network handle of the plurality of network handles that identifies a first position in the enterprise hierarchy. In response to the request, the first enterprise node selects for the session a second network handle of the plurality of network handles that identifies a second position in the enterprise hierarchy. The communication system further includes a communication device of the plurality of communication devices registered as a second enterprise node configured to, upon selection of the second handle, establish the session with the participant node.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
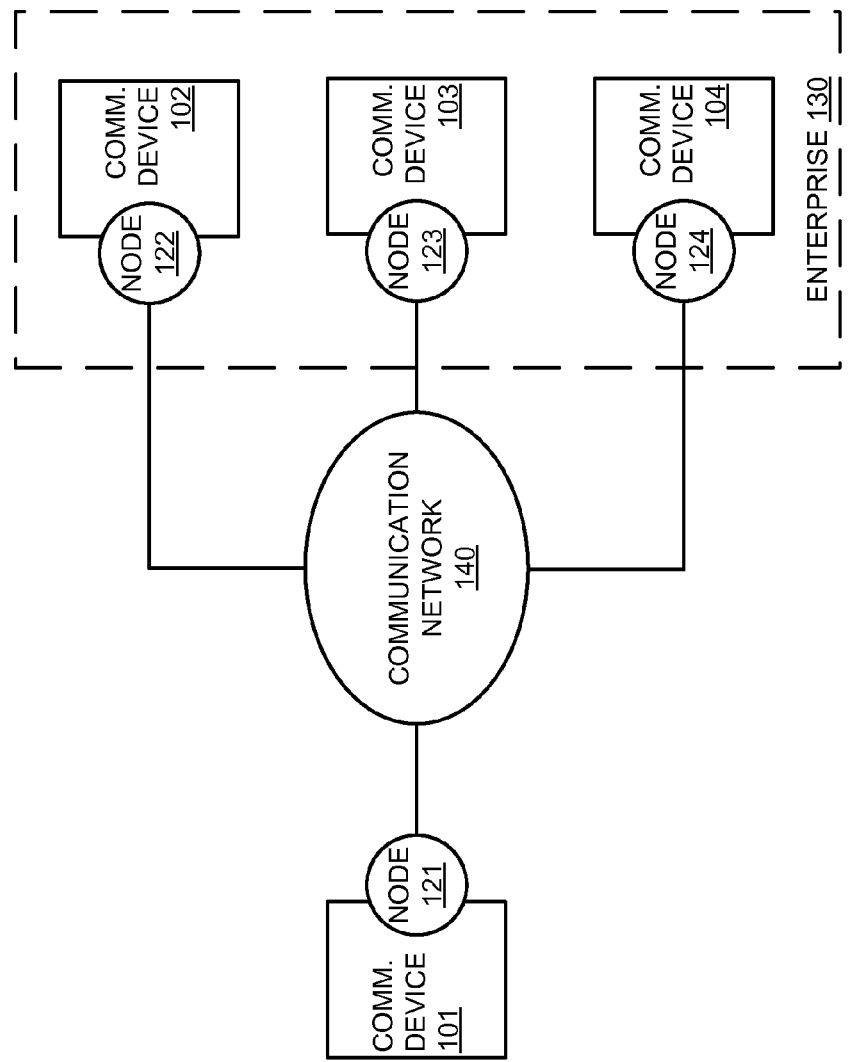
FIG. 1 illustrates a communication system.

FIG. 1 illustrates communication system 100. Communication system 100 includes communication devices 101-104 and communication network 140. Communication devices 101-104 are configured to operate as nodes 121-124, respectively, in a peer-to-peer communication (P2P) network.

A P2P network is a network of two or more registered nodes that communicate with each other through traditional packet based communication networks, such as local area networks, wide area networks, the Internet, or any other type of communication network capable of connecting communication devices—including combinations thereof. Thus, a P2P network may be an application running over communication network 140 using the protocols of communication network 140. Communication devices register as nodes with a P2P network using network handles, such as a user name for a specific P2P network.

While the P2P network is aware of the nodes based on the nodes respective handles, in order to exchange P2P communications between nodes, a routing identifier must be known for the nodes in order to direct communications to communication devices acting as the nodes on communication network 140. A routing identifier, such as an IP address, is what identifies a communication device to communication network 140. Thus, a P2P node running on communication network 140 uses the routing identifier associated with the handle of another node to send P2P application communications to the communication device of the other node. The P2P node may communicate directly with the other node but may also communicate through super nodes and relay nodes that are used for routing communications over network address translation (NAT) regions in the underlying network.

Figure 2:
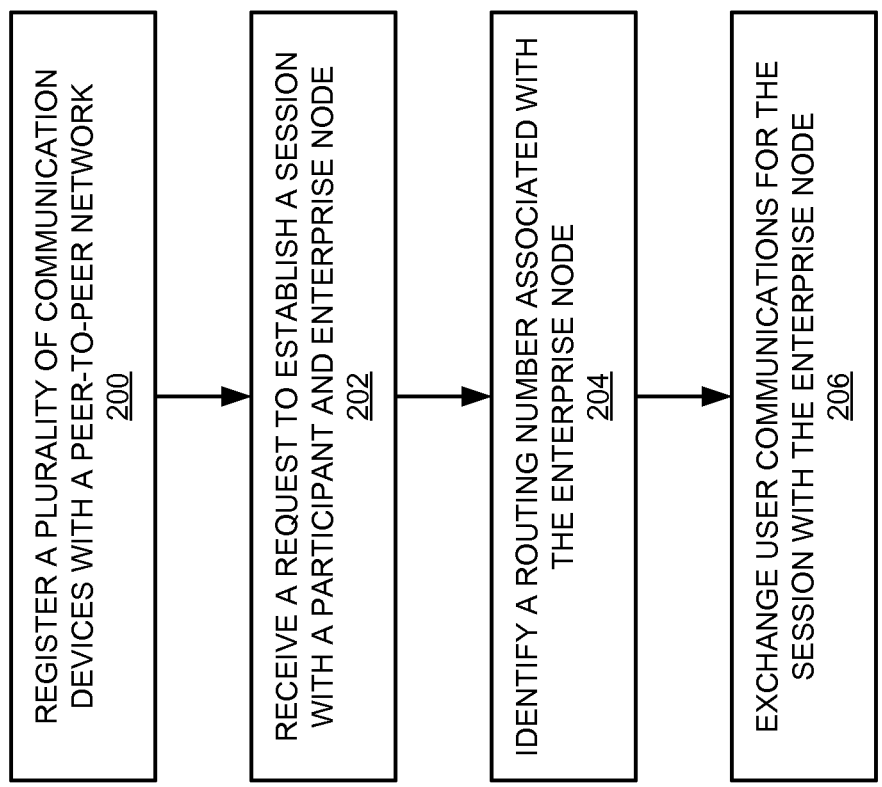
FIG. 2 illustrates the operation of a communication system.

FIG. 2 illustrates the operation of communication system 100. Communication devices 102-104 register with a P2P network using communication network 140 as the medium for communications (step 200). Communication devices 102-104 register as enterprise nodes 122-124 with the P2P network. Enterprise nodes 122-124 are like any other node that registers with the P2P network. However, enterprise nodes 122-124 are associated with enterprise 130. Enterprise 130 may be a business, corporation, educational institution, or any other type of entity capable of registering multiple nodes with a P2P network. Enterprise 130 may manage the enterprise network on the P2P network. Thus, enterprise 130 may change the enterprise node handles and respective position of each handle in the enterprise hierarchy independent of the node registration in the P2P network.

The P2P network identifies enterprise nodes 122-124 using network handles that indicate the position of each node in a hierarchy of enterprise 130. For example, the hierarchy of enterprise 130 may include a first hierarchal level comprising different departments within enterprise 103, such as sales, service, billing, etc. Subsequent levels in the hierarchy may include sub-departments of enterprise 130 and/or employees of enterprise 130. The handles may include a local part and a domain similar to an email or web address, a telephone number, a telephone extension, or any other type of node identifier. Other nodes on the P2P network may use the handle of a specific node to set up a session with that node over the P2P network.

Communication device 101 also registers with the P2P network as participant node 121. Participant node 121 is identified to the P2P using a network handle. While FIG. 1 shows that participant node 121 is not part of enterprise 130, in some embodiments participant node 121 may be an enterprise node of enterprise 130. In those embodiments, the following steps illustrate intra-enterprise calls rather than calls from a participant outside of enterprise 130.

In this example, participant node 121 initiates a session request to establish a session with an enterprise node in enterprise 130. The session may be voice, video, text chat, or other data transfer—including combinations thereof. The P2P network receives the request to establish a session with the participant node 121 and an enterprise node (step 202). For the purposes of this example, the enterprise node is enterprise node 123. The session request uses a first network handle that identifies a first position in the enterprise hierarchy. The position in the enterprise hierarchy is an enterprise node that is located at a first level in the enterprise hierarchy. One of enterprise nodes 122-124 may be assigned the first network handle or there may be another communication device, such as a gateway, registered as a node on the P2P network that performs node registrations and receives session requests.

In response to receiving the session request, a routing identifier associated with enterprise node 123 is identified (step 204). The routing identifier may be a network address, such as an IP address, or another identifier that identifies communication device 103 registered as enterprise node 123 to communication network 140. The P2P network may process information obtained when each node registers with the P2P network. The registration information associates routing identifiers with the network handles of nodes 122-124 to determine which one of the routing identifiers is associated with the first network handle. A routing table may be kept in order to associate the network handles with corresponding routing identifiers or some other method may be used to associate network handles with routing identifiers. Enterprise node 123 may be the only node associated with the first network handle. Alternatively, enterprise node 123 may be selected from amongst other enterprise nodes, such as enterprise nodes 122 and 124. Enterprise node 123 may be selected based on availability of a user associated with node 123, expertise of the user, randomly, or any other node selection method.

In some embodiments, the routing identifier associated with enterprise node 123 is identified by selecting a second network handle that identifies a second position in the enterprise hierarchy. The second network handle may identify a node at the first position in the enterprise hierarchy or may identify a node at a different second position in the enterprise hierarchy. The P2P network then processes the registration information associating routing identifiers with the plurality of network handles to determine which one of the routing identifiers is associated with the second network handle. Similar to above, the routing identifier could be determined using a routing table among other methods.

User communications can then be exchanged between communication device 101 registered as participant node 121 and communication device 103 registered as enterprise node 123 using the routing identifier (step 206). Therefore, in operation, communication device 101 registered as participant node 121 requests a session with a first position in the enterprise hierarchy and, after processing the first network handle associated with the first position in the enterprise hierarchy, is connected with communication device 103 registered as enterprise node 123.

Communication network 140 is a communication network that comprises telephony switches, wireless access nodes, Internet routers, network gateways, computer systems, communication links, or some other type of communication equipment—including combinations thereof.

The links connecting communication devices to communication network 140 may be wireless or wireline links. Wireless links use the air or space as the transport media. Wireless links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Wireline communication links use metal, glass, or some other material as the transport media. The wireline communication links could use various communication protocols, such as Time Division Multiplex (TDM), Internet Protocol (IP), Ethernet, communication signaling, or some other communication format—including combinations thereof. The communication links could be direct links or may include intermediate networks, systems, or devices.

Figure 3:
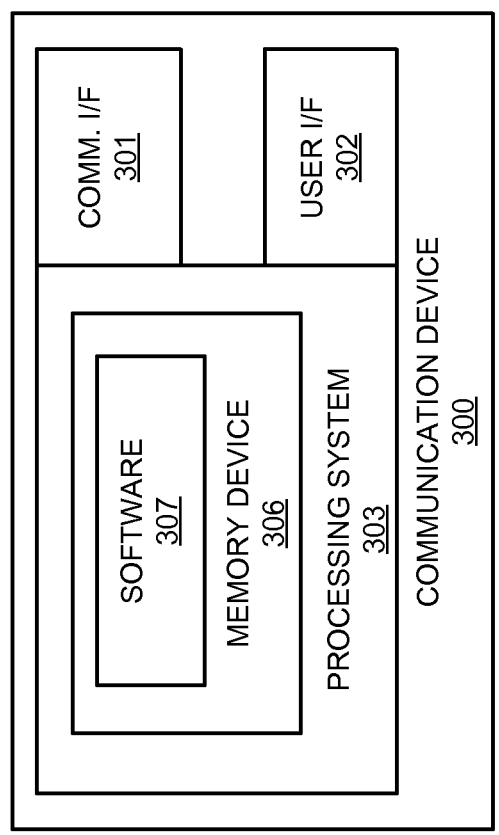
FIG. 3 illustrates a communication device.

FIG. 3 illustrates communication device 300. Communication device 300 is an example of communication devices 101-104, although devices 101-104 could use alternative configurations. Communication device 300 comprises communication interface 301, user interface 302, and processing system 303. Processing system 303 is linked to wireless communication interface 301 and user interface 302. Processing system 303 includes memory device 306 that stores software 307. Communication device 300 may include other well-known components such as a power supply or battery and enclosure that are not shown for clarity. Communication device 300 may be a telephone, communication gateway, Internet Protocol Private Branch Exchange (IP PBX), computer, server, e-book, Internet appliance, media player, game console, wireless network interface card, or some other wireless communication apparatus—including combinations thereof.

Communication interface 301 comprises communication circuitry. Additionally, communication interface 301 may include RF communication circuitry and an antenna if communication device 300 is capable of wireless communications. The communication circuitry typically includes an amplifier, filter, modulator, signal processing circuitry, and any other circuitry necessary for communication interface 301 to communicate with communication network 140 of FIG. 1. Wireless communication interface 301 may also include a memory device, software, processing circuitry, or some other communication device. Communication interface 301 may use various protocols, such as Time Division Multiplex (TDM), Internet Protocol (IP), Ethernet, communication signaling, CDMA, EVDO, WIMAX, GSM, LTE, WIFI, HSPA, or some other communication format.

User interface 302 comprises components that interact with a user to receive user inputs and to present media and/or information. User interface 302 may include a speaker, microphone, buttons, lights, display screen, touch screen, touch pad, scroll wheel, communication port, or some other user input/output apparatus—including combinations thereof. User interface 302 may omitted in some examples.

Processing system 303 comprises microprocessor and other circuitry that retrieves and executes software 307 from memory device 306. Memory device 306 comprises a disk drive, flash drive, data storage circuitry, or some other memory apparatus. Processing system 303 is typically mounted on a circuit board that may also hold memory device 306, portions of communication interface 301 and user interface 302. Software 307 comprises computer programs, firmware, or some other form of machine-readable processing instructions. Software 307 may include an operating system, utilities, drivers, network interfaces, applications, or some other type of software. When executed by processing circuitry 305, software 307 directs processing system 303 to operate communication device 300 as described herein.

In particular, software 307 directs processing system 303 to register as an enterprise node in a P2P network. The node identified by a network handle indicates the position of the node in an enterprise hierarchy. Communication interface 301 receives a request to establish a session with a participant node and an enterprise node using a first network handle that identifies a first position in the enterprise hierarchy. In response to the request, processing system 303 identifies a routing identifier associated with the enterprise node. Communication interface 301 may then exchange user communications for the session with a communication device registered as the enterprise node using the routing identifier.

Different communication devices may perform different parts of the steps described above, however, connection to a P2P network allows each of the communication devices to each be capable of performing the same functions.

Figure 4:
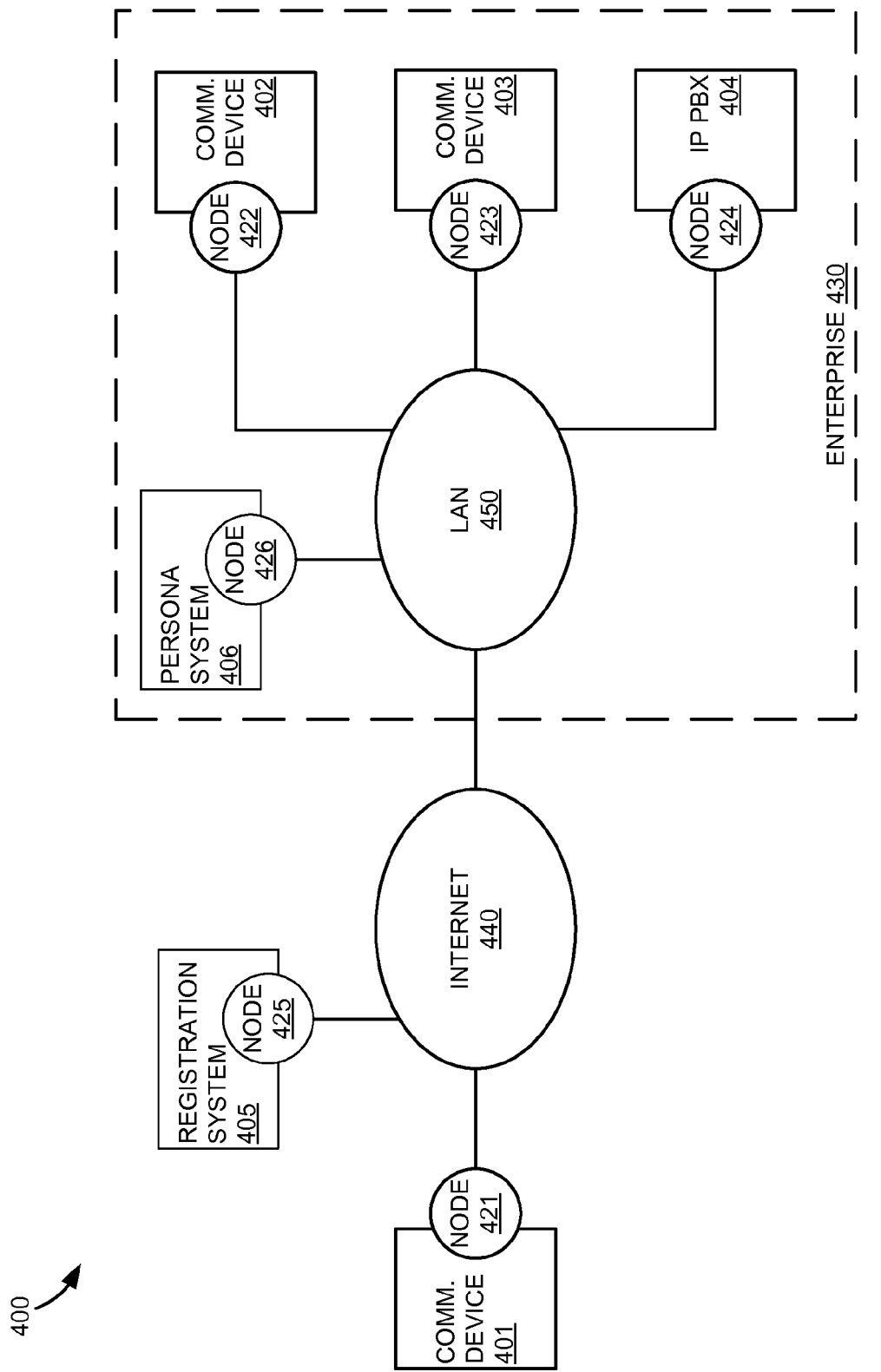
FIG. 4 illustrates a communication system.

FIG. 4 illustrates communication system 400. Communication system 400 includes communication devices 401-403, Internet Protocol Private Branch Exchange (IP PBX) 404, registration system 405, persona system 406, Internet 440, and local area network (LAN) 450. Communication devices 401-406 are configured to operate as nodes 421-426 on a peer-to-peer communication (P2P) network.

Nodes 422-424 and 426 are configured to operate as enterprise nodes for enterprise 430. Enterprise nodes 422-424 and 426 are connected to the Internet 440, and other peers such as nodes 401 and 405, through LAN 450. Thus, LAN 450 may be operated by enterprise 430. However, enterprise nodes 422-424 and 426 may be connected to other peers or Internet 440 through other communication networks other than LAN 450. For example, enterprise 430 may not operate a LAN or some of communication devices 402-404 and 406 may be located elsewhere from LAN 450. Similarly, enterprise nodes 422-424 and 406 do not need to be located in the same geographic location in order to operate as enterprise nodes for enterprise 430. For example, a salesperson may carry communication device 404 that is registered as enterprise node 424 on sale calls to many different geographic locations.

Registration system 405 is a communication device that is registered with the P2P network as node 425. Node 425 keeps track of the routing information for other nodes registered with the P2P network. In order to communicate with other nodes on the P2P network each connecting node must register with node 405. Registration is necessary because, in order to exchange communications with another node, a peer node in a P2P network must know network routing information for the other peer node. For example, node 421 may know the network handle of node 422 but not the routing identifier for communication device 402. Node 421 must query registration system 405 registered as node 425 to determine a routing identifier, such as an IP address, for communication device 402. Upon receiving the routing identifier for communication device 402, communication device 401 can exchange user communications with device 402 by routing the communications to the routing identifier.

In some embodiments, there may be more than one registration system similar to registration system 405 and each system may track a subset of the total number of network handles and the routing identifiers of corresponding communication devices. Thus, if one registration does not have a routing identifier for a particular network handle, then other registration systems can be queried in an attempt to find the corresponding routing identifier.

IP PBX 404 is a communication device that can be installed in an enterprise to provide data based communication services, such as voice over IP, to devices associated with the enterprise, such as employee devices. The structure of IP PBX 404 is exemplified by communication device 300 in FIG. 3 but may use alternative configurations. IP PBX 404 is also capable of interfacing with a public switched telephone network (PSTN). In communication system 400, IP PBX 404 is configured to act as a node on a P2P network. In some embodiments, IP PBX 404 may also perform the functions of registration system 405.

Persona system 406 is a computer system that gathers and stores persona information for enterprise nodes 422-424. Additionally, persona system 406 may gather and store persona information for any nodes connecting to enterprise nodes 422-424. Persona information may include the name of the user of a node, the handle of the node, the position of the node in the enterprise hierarchy, or any other information that may be pertinent about a node on a P2P network. Persona system may transfer the persona information for one node in a P2P session to another node in the P2P session for presentation to a user. The communication device registered as the node receiving persona information may present the information for the user by being displayed on a screen, voiced through a speaker, or any other way of conveying information to a user. The functionality of persona system 406 may be incorporated into IP PBX 404.

Figure 5:
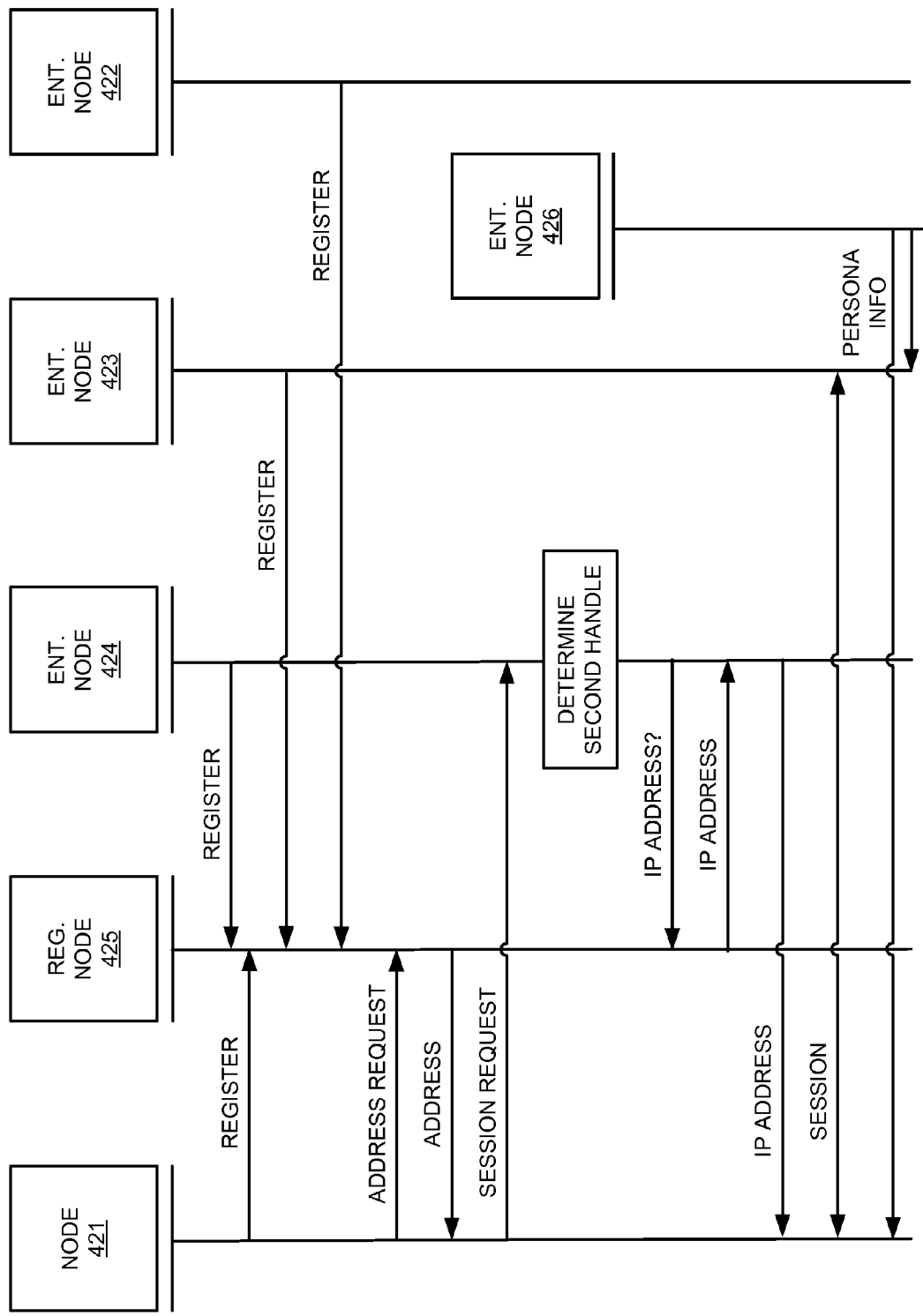
FIG. 5 illustrates the operation of a communication system.

FIG. 5 is a sequence diagram illustrating the operation of communication system 400 for routing P2P sessions among enterprise nodes in an enterprise hierarchy. In this example, enterprise node 424 does not know the routing identifiers for enterprise nodes 422-423 that are at other levels in the enterprise hierarchy and needs to obtain routing identifiers for other enterprise nodes by querying registration node 425. Registration system was previously registered as registration node 425 on a P2P network. The sequence begins with communication devices 401-403 and IP PBX 404 registering with registration system 405. After registration, communication devices 401-403 and IP PBX 404 are registered as nodes 421-424 on the P2P network. Particularly, communication devices 402-403 and IP PBX 404 are registered as enterprise nodes that are associated with enterprise 430. Although shown outside of enterprise 430, registration system 405 may be a registration system solely for nodes associated with enterprise 430.

The sequence continues with node 421 initiating a session request using a

P2P network handle that indicates a first position in a hierarchy for enterprise nodes 402-404. In this example, enterprise node 424 is the node in the P2P network indicated by the handle and enterprise node 424 is located at the top level of the enterprise hierarchy. Node 421 needs the IP address of the device registered as enterprise node 424 in order to initiate a session with enterprise node 424 on IP PBX 404. Thus, node 421 transfers a request for the IP address of the communication device associated with enterprise node 424. Node 425 of registration system 405 receives the session request with the handle for enterprise node 424 and processes the request to determine an IP address for IP PBX 404. Node 421 receives the IP address of IP PBX 404 and transfers the session request to enterprise node 424 on IP PBX 404 using the IP address.

IP PBX 404 registered as enterprise node 424 receives the session request from node 421. In this example, IP PBX 404 does not exchange user communications with other nodes. Instead, IP PBX 404 processes the session request to determine a second handle indicating the position of a node at a second level in the enterprise hierarchy with which to forward the session request. This example provides that IP PBX 404 determines that enterprise node 403 should handle the session with node 421. Node 424 requests the IP address of the communication device registered as enterprise node 423 from registration system node 425. Upon receiving the IP address from registration system node 405, enterprise node 424 transfers the IP address to node 421. Node 421 then uses the IP address of communication device 403 to initiate a session and exchange user communications with communication device 403 registered as enterprise node 423.

In some embodiments, enterprise node 424 may act as an intermediary node between enterprise node 423 and node 421. Thus, communications exchanged between nodes 421 and 423 pass through node 424. This process is sometimes called back-to-back user agent. In other embodiments, enterprise node 424 may facilitate the initiation of the session by redirecting the session request to enterprise node 423.

In some embodiments, enterprise 430 manages the enterprise nodes. In those embodiments each enterprise node may be assigned an overlay ID for the enterprise network. Thus, when determining an address for a destination enterprise node, the overlay ID may first be determined based on the handle of the enterprise node, then the IP address is determined based on the overlay ID. Additionally, there may be multiple overlays on a P2P network. For example, another overlay could be another independent enterprise network operated by another enterprise. The overlay itself will have an overlay address identifying the overlay and a node address for a peer within the overlay. The enterprise hierarchy described herein applies to the node address (handles) within the P2P overlay operated as an enterprise network by enterprise 430. Therefore, registration node 425 may only be able to route a handle of a node in the enterprise hierarchy to the overlay associated with the enterprise network. After the session is routed to the overlay, an enterprise node such as node 424, or another registration node internal to the overlay, will resolve the message to the correct enterprise node in the enterprise hierarchy.

In some embodiments, node 421 and enterprise node 423 may receive persona information about the other node from persona system 406 registered as node 426. Persona information may include the identity of a user, the identity of an entity, the handle, or any other information that would be pertinent for display on a communication device. Alternatively, the persona information may be exchanged by node 421 and enterprise node 423 without the use of persona system 406.

Figure 6:
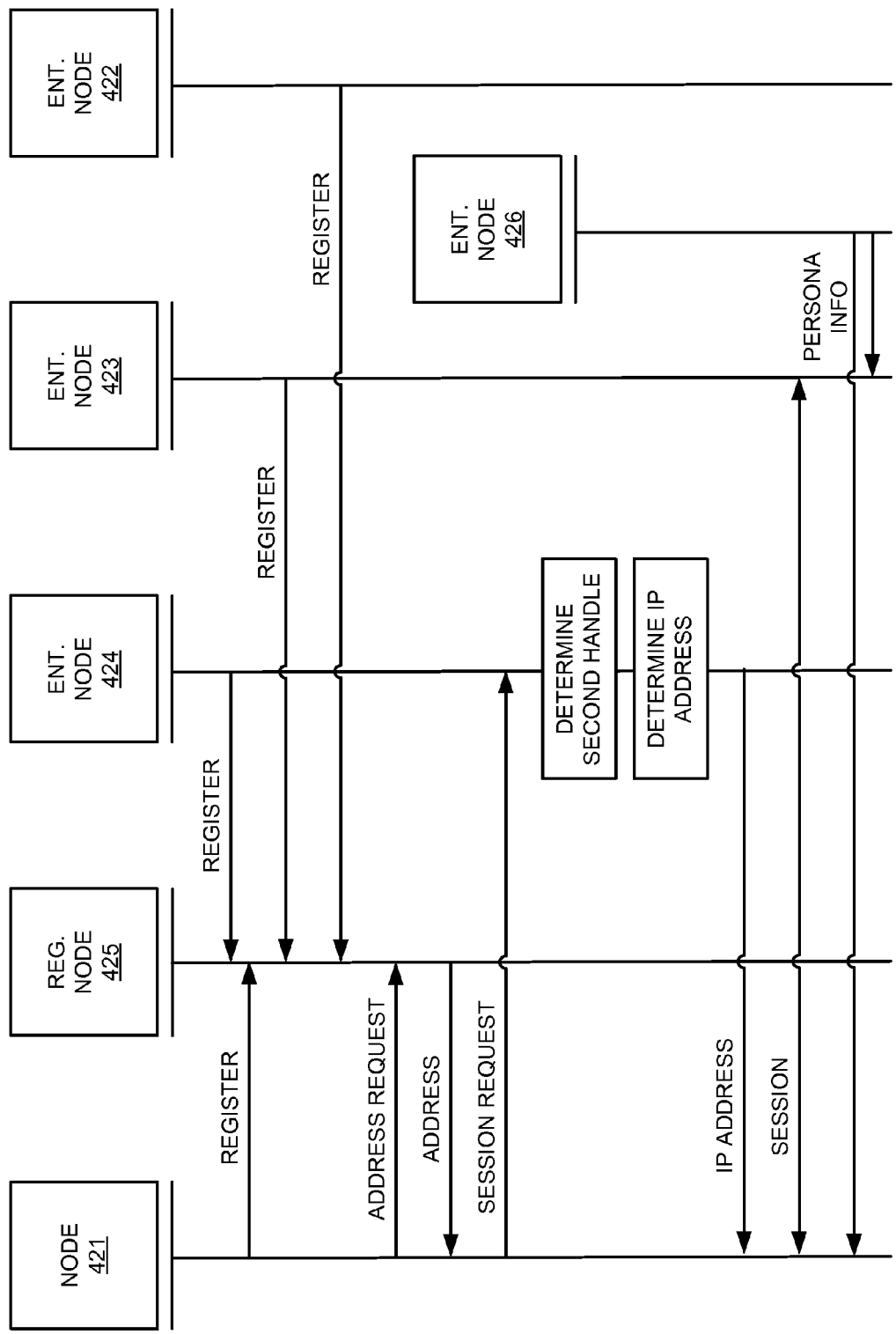
FIG. 6 illustrates the operation of a communication system.

FIG. 6 is a sequence diagram illustrating the operation of communication system 400 for routing P2P sessions among enterprise nodes in an enterprise hierarchy. In this example, enterprise node 424 knows the routing identifiers for enterprise nodes 422-423 that are at other levels in the enterprise hierarchy and does not need to obtain routing identifiers for other enterprise nodes by querying registration node 425. Registration system was previously registered as node 425 on a P2P network. The sequence begins with communication devices 401-403 and IP PBX 404 registering with registration system 405. Communication devices 401-403 and IP PBX 404 are therefore registered as nodes 421-424 on the P2P network. Communication devices 402-403 and IP PBX 404 are registered as enterprise nodes that are associated with enterprise 430. Although shown outside of enterprise 430, registration system 405 may be a registration system solely for nodes associated with enterprise 430.

The sequence continues with node 421 initiating a session request using a P2P network handle that indicates a first position in a hierarchy for enterprise nodes 402 -404. In this example, enterprise node 424 is the node in the P2P network indicated by the handle and enterprise node 424 is located at the top level of the enterprise hierarchy. Node 421 needs the IP address of the device registered as enterprise node 424 in order to initiate a session with enterprise node 424 on IP PBX 404. Thus, node 421 transfers a request for the IP address of the communication device associated with enterprise node 424. Node 425 of registration system 405 receives the session request with the handle for enterprise node 424 and processes the request to determine an IP address for IP PBX 404. Node 421 receives the IP address of IP PBX 404 and transfers the session request to enterprise node 424 on IP PBX 404 using the IP address.

IP PBX 404 registered as enterprise node 424 receives the session request from node 421. In this example, IP PBX 404 does not exchange user communications with other nodes. Instead, IP PBX 404 processes the session request to determine a second handle indicating the position of a node at a second level in the enterprise hierarchy with which to forward the session request. This example provides that IP PBX 404 determines that enterprise node 403 should handle the session with node 421. This example also provides that IP PBX 404 knows the routing information for the other enterprise nodes in the enterprise hierarchy. Thus, enterprise node 404 transfers the IP address of communication device 403 to node 421.

Node 421 then uses the IP address of communication device 403 to initiate a session and exchange user communications with enterprise node 423.

In some embodiments, node 421 and enterprise node 423 may receive persona information about the other node from persona system 406 registered as node 426. Persona information may include the identity of a user, the identity of an entity, the handle, or any other information that would be pertinent for display on a communication device. Alternatively, the persona information may be exchanged by node 421 and enterprise node 423 without the use of persona system 406.

In some examples, communication device 401 may be a standard telephone or VoIP phone rather than a soft phone that can register directly. In those cases IP PBX 404 or some other communication device may play the intermediary between communication device 401 and the P2P network so that communication device 401 can communicate with enterprise nodes 422-424.

Figure 7:
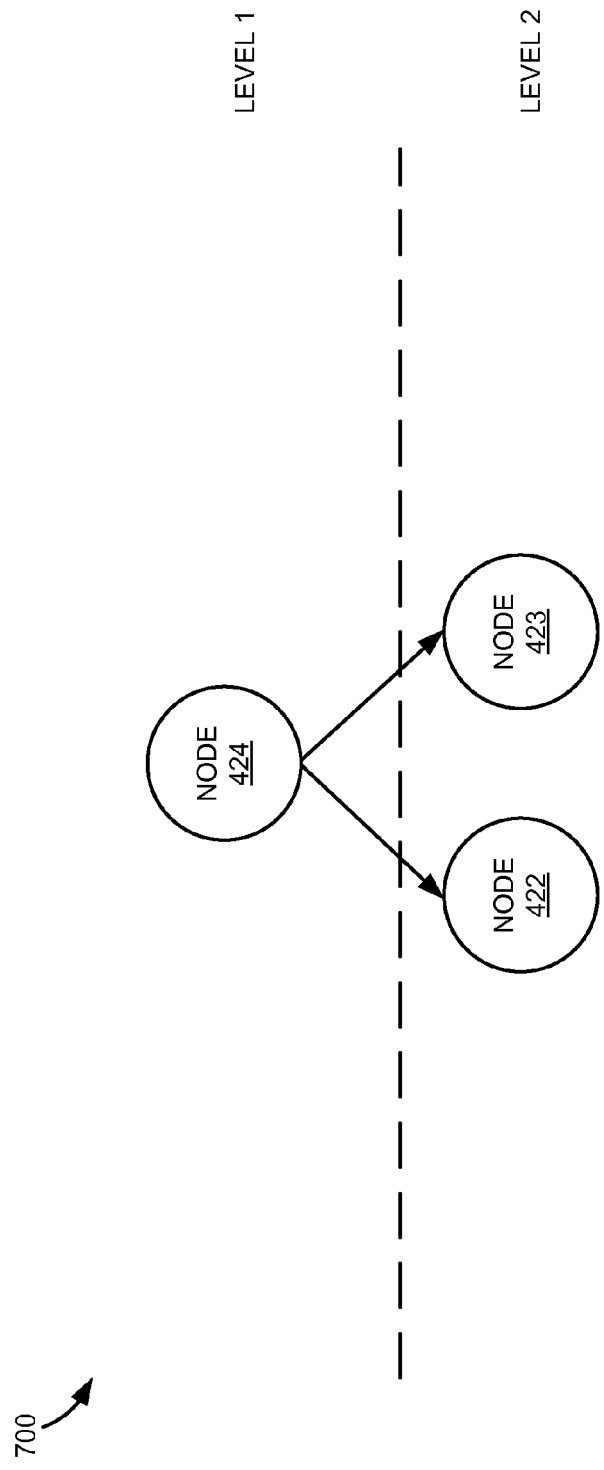
FIG. 7 illustrates an enterprise node hierarchy.

FIG. 7 is an abstraction of how enterprise nodes 422-424 in FIG. 4 registered with a P2P network may be arranged in a hierarchy. Traditional P2P networks do not make distinctions based on the handles of connected nodes and, thus, do not have different hierarchal levels. In this example, enterprise node 424 is at a first hierarchal level and nodes 422 and 423 are at a second. Therefore, in accordance with the examples of FIGS. 5 and 6, an incoming session request received in enterprise node 424 at level 1 can be completed to either of enterprise nodes 422 or 423 at level 2. Enterprise node 424 may choose between enterprise node 422 and 423 based on availability of a user associated with either enterprise node, expertise of the user, randomly, a user input such as an entered extension or answer to a query, or any other reason to select one enterprise node over another.

Figure 8:
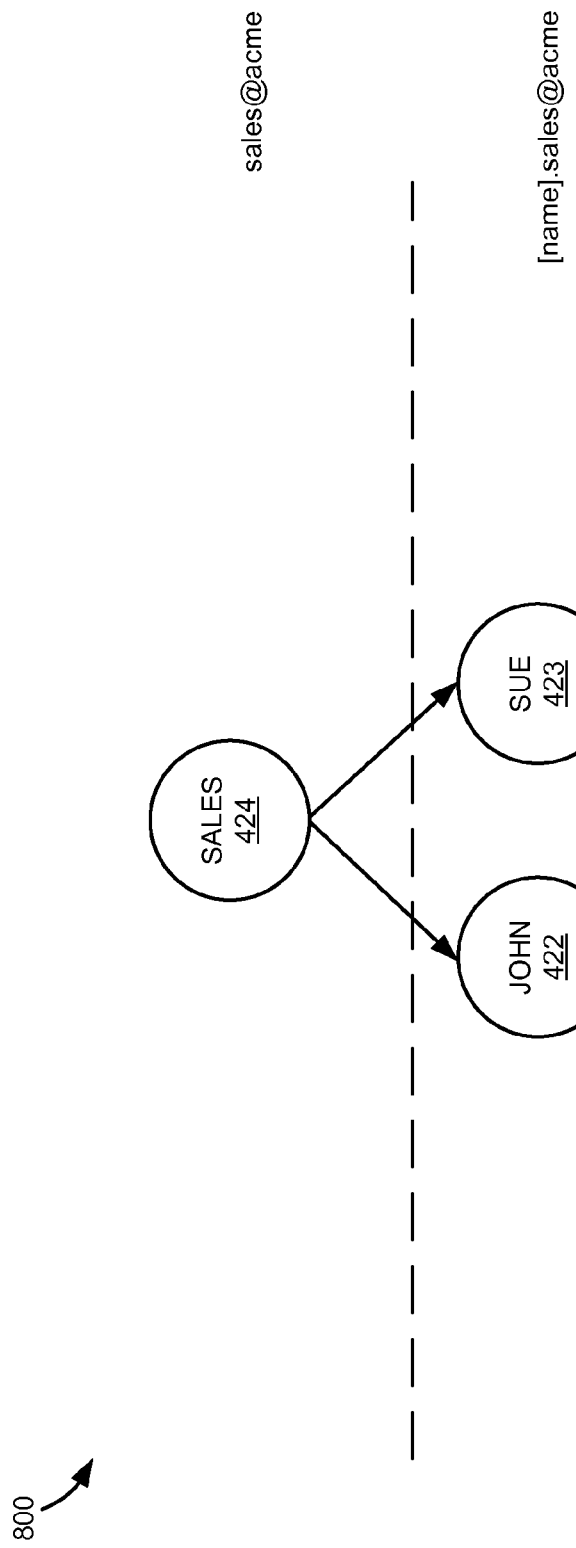
FIG. 8 illustrates an enterprise node hierarchy.

FIG. 8 is a more detailed abstraction of how enterprise nodes 422-424 in FIG. 4 that are registered with a P2P network may be arranged in a hierarchy. Enterprise node 424 is shown at a first level in the enterprise hierarchy. In this example, enterprise 430 is a company called Acme, enterprise node 424 represents the sales organization of Acme, enterprise node 422 represents salesperson John, and enterprise node 422 represents salesperson Sue. John and Sue are registered with the P2P network using communication devices 402 and 403 respectively. Communication devices 402 and 403 may be computer workstations, cellular phones, soft phones, or any other type of device that John and Sue could use to connect with the P2P network.

In this example, a customer participant may use communication device 401 to register with the P2P network. The customer wishes to purchase something from Acme. Thus, the customer enters the network handle for the Acme sales department to engage in a voice, video, or text chat with a sales representative from Acme. The customer indicates sales@acme to communication device 401. The customer may indicate the handle by entering it manually, selecting it from a list, selecting it from a website, or any other way that a network handle can be indicating in a communication device. Handle for node 424 is shown to be in the format [local part]@[domain] but could take many other formats such as, but not limited to, sales.acme.com, acme.com/sales, acme.P2Pnetwork.com/sales. The domain indicates the enterprise being Acme and the local part indicates the node within the first level of the enterprise hierarchy. The domain is therefore different depending on the enterprise represented by the hierarchy and the P2P network may support multiple domains. Alternatively, if customers are accessing the P2P network from a standard telephone interface, then the handle may take the form of a phone number, such as 800-555-2604.

In some embodiments, the enterprise and/or overlay operator may need to take security measures so that someone other than the enterprise cannot hijack the domain. For example, a customer wanting to establish a session with a handle in the @acme domain would want to be confident that any handle with the @acme domain is actually associated with the Acme enterprise.

In some examples, node 424 may be associated with a salesperson, as may be the case if Acme only had one salesperson. However, in this example, sales node 424 is not associated with a salesperson and must determine which of enterprise nodes 422 and 423 to transfer the session to. Sales node 424 determines that the session should be executed to John at node 422. Enterprise node 422 is identified by the network handle john.sales@acme. The network handle of enterprise node 422 includes a second local part that further indicates a second level in the enterprise hierarchy different from the level of enterprise node 424. Alternatively, if customers are accessing the P2P network from a standard telephone interface, then the handle for enterprise node 422 may take the form of a phone number extension, such as 800-555-2604 x986. Customer communication device 421 therefore receives the IP address for the communication device operated by John as node 422 and establishes a session for user communications between the customer and John.

Figure 9:
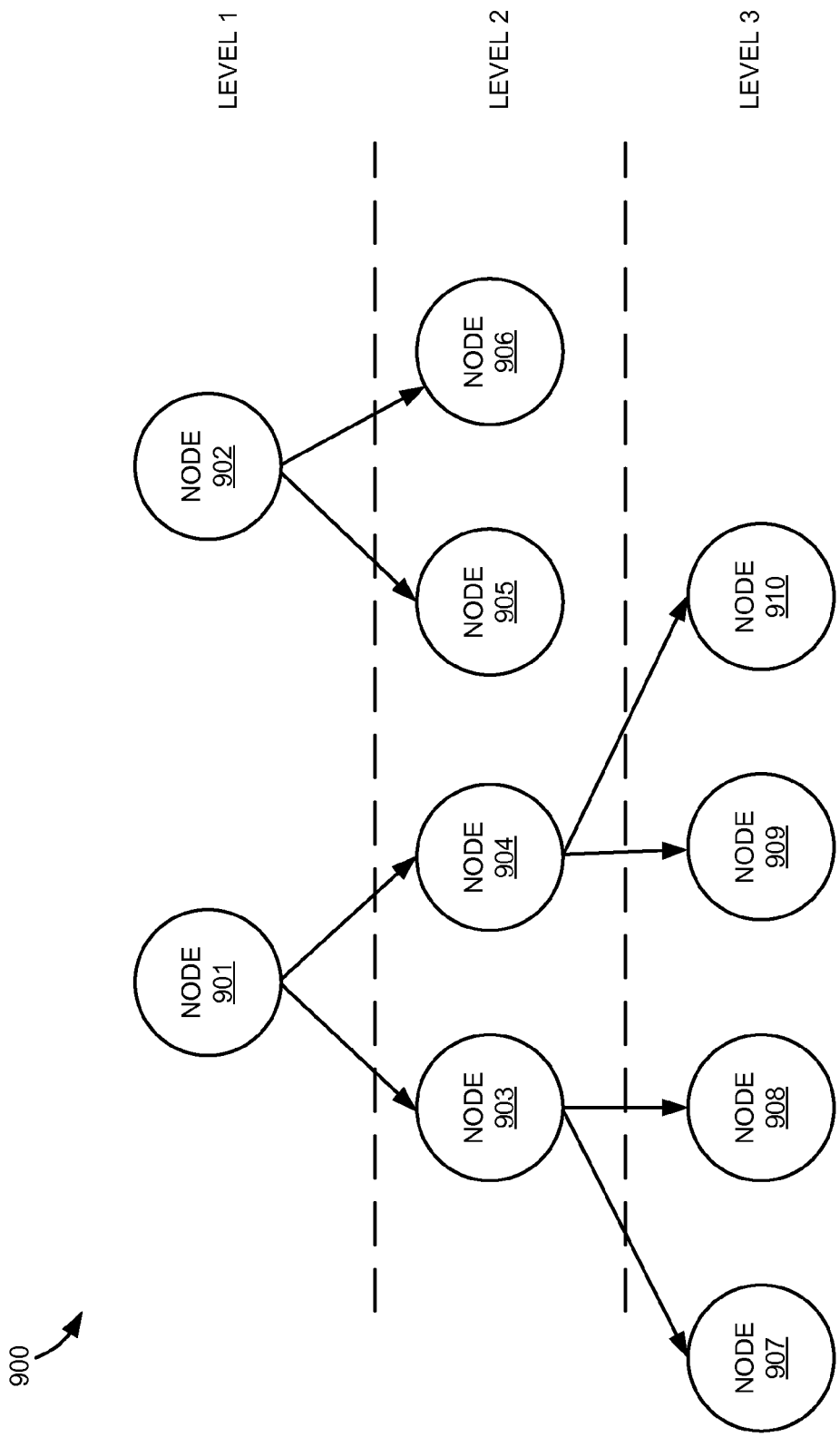
FIG. 9 illustrates an enterprise node hierarchy.

FIG. 9 is an abstraction of how more enterprise nodes may be organized in an enterprise hierarchy. In particular, FIG. 9 provides an example of how more than three nodes can comprise an enterprise hierarchy at three hierarchal levels. There is no effective limit on the number of nodes and levels that can be organized in an enterprise hierarchy. In basic operation, a session directed to the handle of node 901 at level 1 is processed to determine a second handle associated with enterprise node 903 or 904 at level 2. If enterprise node 904 is selected, then the session can then be processed to determine a third handle associated with enterprise node 909 or 910 at level 3. Likewise initial session could be directed to the handle of node 902 at level 1, which can then be processed to determine a handle for enterprise nodes 905 or 906 at level 2 in the hierarchy.

Figure 10:
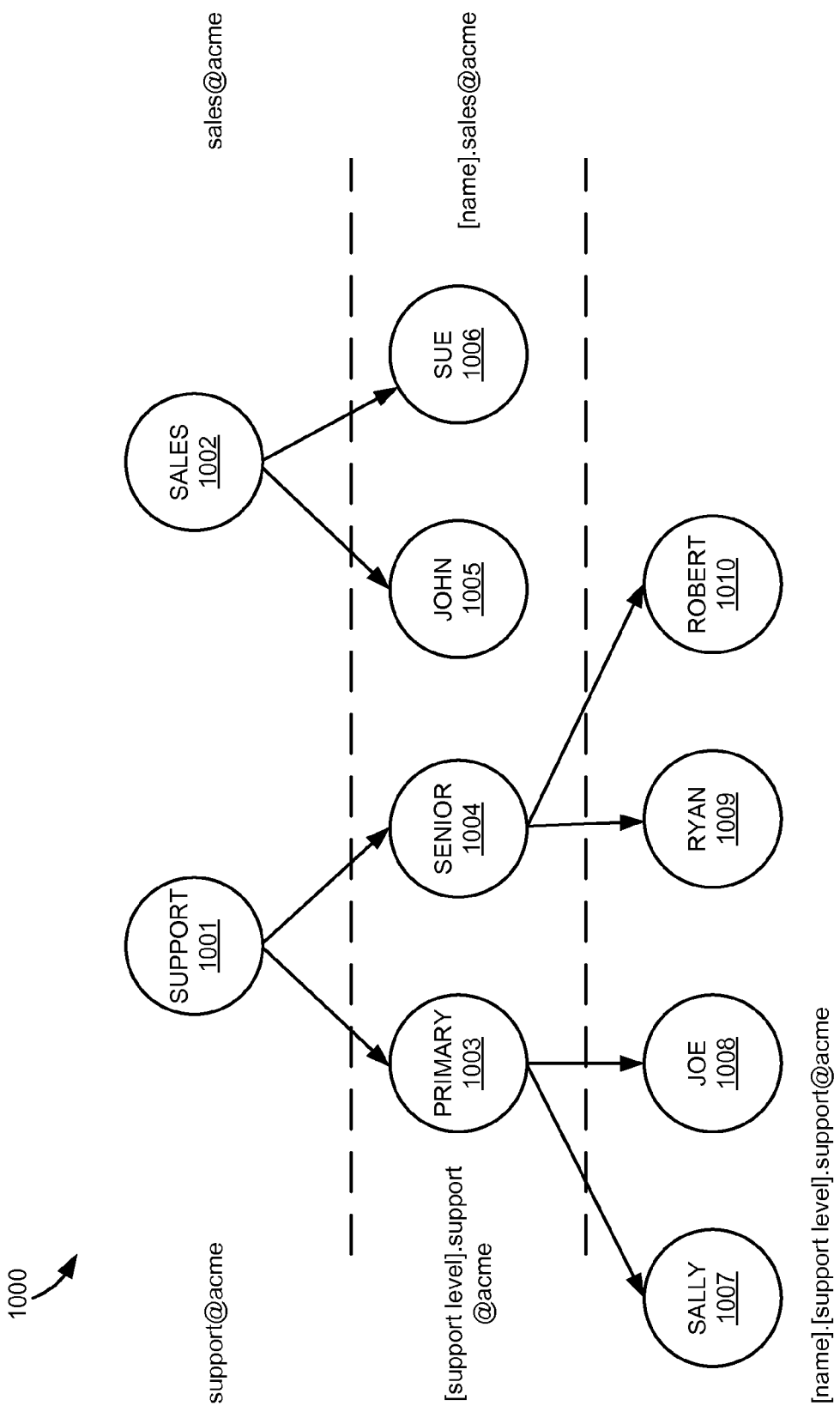
FIG. 10 illustrates an enterprise node hierarchy.

FIG. 10 is a more detailed abstraction of the enterprise nodes in FIG. 9. Enterprise nodes 1001 and 1002 are again part of Acme at a first level in the enterprise hierarchy. Enterprise node 1001 is for tech support and enterprise node 1002 is for sales. The handles are support@acme and sales@acme respectively. While only tech support and sales are shown, the acme hierarchy at level 1 could also include nodes for other organizations within Acme such as billing and human resources. When a customer indicates support@acme, enterprise node 1001 determines a second handle for the session associated with enterprise node 1003 or 1004 in a second level of the enterprise hierarchy. In this example, primary node 1003 corresponds to a primary level of tech support for initial calls to tech support, while senior node 1004 corresponds to a senior level of tech support for calls that cannot be resolved by primary tech support. If this is first call made by the customer to tech support, then support node 1001 determines that the second handle is primary.support@acme. Once the session is connected with primary node 1003, primary node 1003 determines a third handle for a third level in the enterprise hierarchy. Based on a user input indicating the customer's tech support issue inputted when the customer was connected with support node 1001 or primary node 1003 (e.g. a response to an Integrated Voice Response (IVR) system menu), primary node 1003 may determine that Joe is best suited to provide tech support for the customer's issue. Thus, joe.primary.support@acme is the third handle at the third level of the enterprise hierarchy. The customer connects with enterprise node 1008 to receive tech support from Joe.

Similarly, Joe may not be able to fix the customer's tech support issue. Therefore, Joe may need to direct the customer to someone in senior tech support. Joe may direct the customer to Ryan by indicating the handle for node 1009, which in this case is ryan.senior.support@acme. Thus, the customer node may be provided a handle to a node at the third level in the hierarchy without having to traverse the other levels. However, Joe may also direct the customer back to senior.support@acme at level 2 or to support@acme at level 1. The nodes at level 1 and 2 can then determine subsequent P2P handles necessary to direct the customer to Ryan or Robert in senior tech support at the third level in the enterprise hierarchy.

Figure 11:
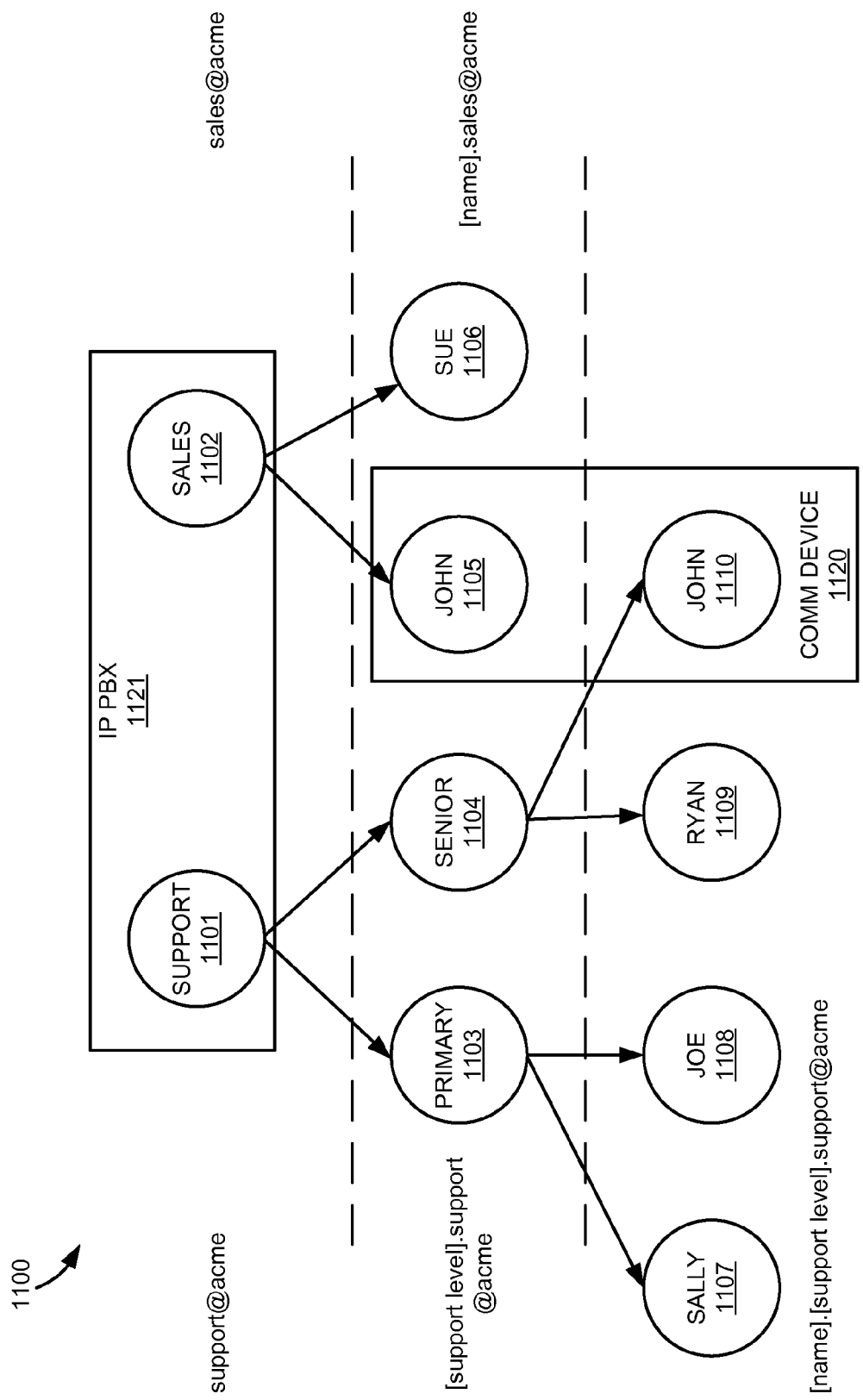
FIG. 11 illustrates an enterprise node hierarchy.

FIG. 11 is a more detailed abstraction of the enterprise nodes in FIG. 10. In this example, the enterprise nodes 1101 and 1102 at the first level of the enterprise hierarchy are registered from the same communication device, IP PBX 1121. Similarly, John is operating communication device 1120, which is registered as enterprise nodes 1105 and 1110. Unlike enterprise nodes 1101 and 1102, enterprise nodes 1105 and 1110 are at different levels in the enterprise hierarchy. John, therefore, is both a sales representative and a senior tech support representative.

While FIG. 11 shows that two enterprise nodes can be registered to a single communication device, any number of enterprise nodes may be registered to a single communication device. Communication devices may be registered as multiple nodes by running multiple instances of P2P software, running a single instance of P2P software that can distinguish between multiple nodes, or any other method of registering multiple nodes on a communication device.

Additionally, a single node may be represented by multiple communication devices. For example, enterprise node 1107 for Sally may be registered by two communication devices, such as a soft phone at Sally's desk and a cellular phone. When it is determined that the network handle at the third level of the enterprise hierarchy is sally.primary.support@acme, then the IP address of one of the two communication devices associated with enterprise node 1107 must also be determined. The connecting node may be instructed to try both IP addresses for the two communication devices, try one before the other, or use some other method of determining which IP address to use when attempting to connect with Sally at node 1107.

In some embodiments, the resolution of the network address of the destination enterprise node may be performed in stages depending on the number of connections within the network involved in routing the session to the destination enterprise node. For example, the address of routers leading to the destination node may first need to be determined before the network of the destination enterprise node can be determined.

Figure 12:
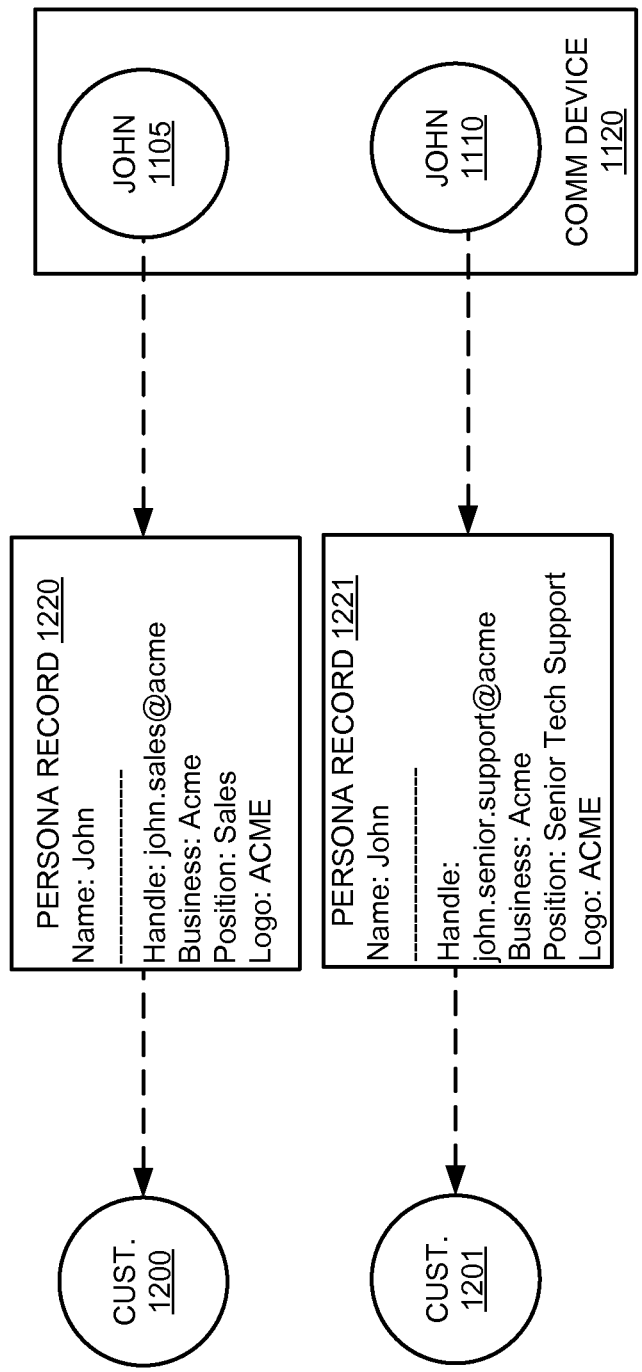
FIG. 12 illustrates persona information.

FIG. 12 illustrates persona information about an enterprise node that may be transferred to a connected node. This example focuses on nodes 1105 and 1110 from FIG. 11. Though shown on their own, enterprise nodes 1105 and 1110 are part of the enterprise hierarchy set forth in FIG. 11. In this example, customer node 1200 connects with enterprise node 1105 in the enterprise hierarchy, which is one of two enterprise nodes associated with John. During session set up or after the session is started, a persona system may send persona record 1220 to customer node 1200 for presentation to a user. Otherwise, enterprise node 1105 may transfer persona record 1220 to customer node 1200 for presentation to a user. The persona information may be presented for the user by being displayed on a screen, voiced through a speaker, or any other way of conveying information to a user. Persona record 1220 indicates that the customer is connected to John, John's handle is john.sales@acme, John is associated with Acme, John's position is sales, and provides the logo of Acme. Persona record 1220 may include other non-pictured fields of pertinent information.

Alternatively, customer node 1201 connects with enterprise node 1110 in the enterprise hierarchy, which is the other of the two enterprise nodes associated with John. During session set up or after the session is started, a persona system may send persona record 1221 to customer node 1201 for presentation to a user. Otherwise, enterprise node 1110 may transfer persona record 1221 to customer node 1201 for presentation to a user. Persona record 1221 indicates that the customer is connected to John, John's handle is john.senior.support@acme, John is associated with Acme, John's position is Senior Tech Support, and provides the logo of Acme. Persona record 1221 may include other non-pictured fields of pertinent information.

Therefore, while customer nodes 1200 and 1201 are both connected to nodes associated with John, customer nodes 1200 and 1201 receive different persona information based on where enterprise nodes 1105 and 1110 fit into the enterprise hierarchy.

Figure 13:
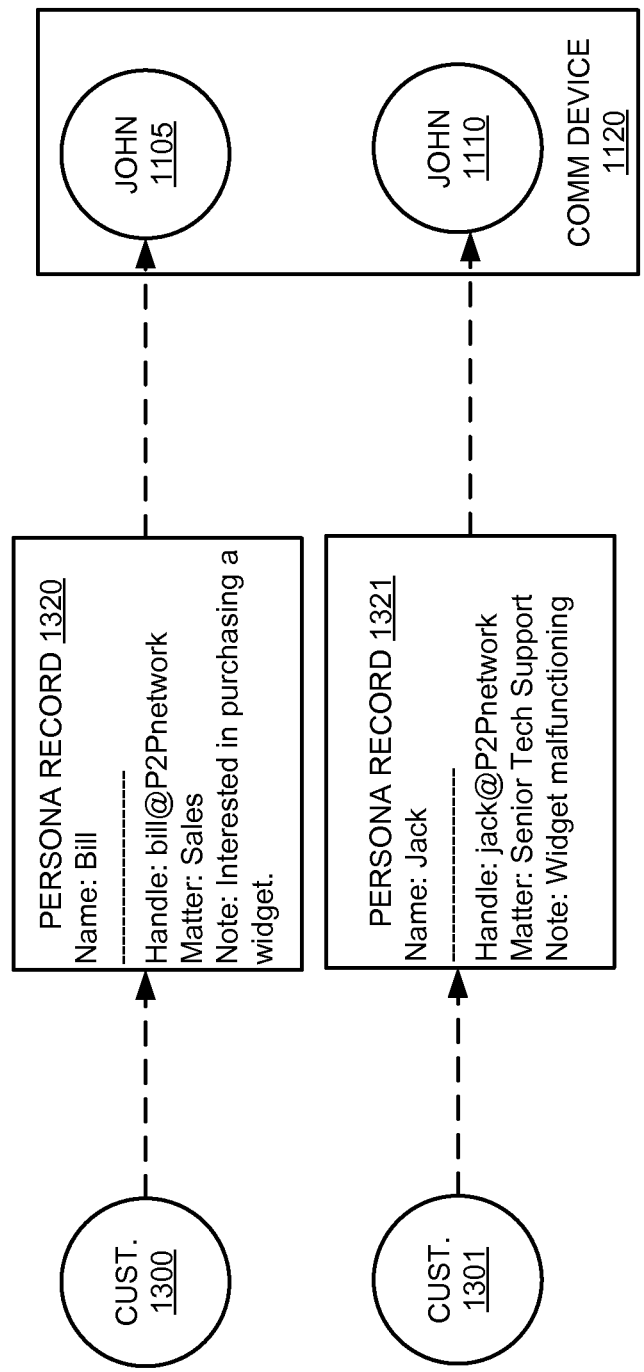
FIG. 13 illustrates persona information.

FIG. 13 illustrates persona information about a connected node that may be transferred to an enterprise node. This example focuses on nodes 1105 and 1110 from FIG. 11. Though shown on their own, enterprise nodes 1105 and 1110 are part of the enterprise hierarchy set forth in FIG. 11. In this example, customer node 1300 connects with enterprise node 1105 in the enterprise hierarchy, which is one of two enterprise nodes associated with John. During session set up or after the session is started, a persona system may send persona record 1320 to enterprise node 1105 for presentation to John. Otherwise, customer node 1300 may transfer persona record 1320 to enterprise node 1105 for presentation to John. The persona information may be presented for John by being displayed on a screen, voiced through a speaker, or any other way of conveying information to a user. Persona record 1320 indicates that the customer's name is Bill, Bill's handle is bill@P2Pnetwork, the matter is regarding sales, and provides John with a note about Bill's reason for calling. Persona record 1320 may include other non-pictured fields of pertinent information.

Alternatively, customer node 1301 connects with enterprise node 1110 in the enterprise hierarchy, which is the other of the two enterprise nodes associated with John. During session set up or after the session is started, a persona system may send persona record 1321 to enterprise node 1110 for presentation to John. Otherwise, customer node 1301 may transfer persona record 1321 to enterprise node 1110 for presentation to John. Persona record 1321 indicates that the customer's name is Jack, Jack's handle is jack@P2Pnetwork, the matter is regarding senior tech support, and provides John with a note about Jack's reason for calling. Persona record 1321 may include other non-pictured fields of pertinent information.

Therefore, John receives persona information from customers that allow John to recognize who the customer is and what matter the customer is calling about. Without the persona information John may not know whether a customer is calling enterprise node 1105 for sales or enterprise node 1110 for tech support.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:

registering a plurality of communication devices with a peer-to-peer network as a plurality of enterprise nodes using a plurality of network handles that identify positions in an enterprise hierarchy, wherein the enterprise hierarchy comprises a plurality of hierarchically organized levels within an enterprise and each of the positions are located at one of the plurality of levels, and wherein the peer-to-peer network comprises a plurality of peer nodes and the plurality of peer nodes includes the plurality of enterprise nodes;

receiving a request to establish a session with a participant node and an enterprise node of the plurality of enterprise nodes using a first network handle of the plurality of network handles that identifies a first position in the enterprise hierarchy; and in response to the request, identifying a routing identifier associated with the enterprise node to use during the session.

2. The method of claim 1 further comprising, exchanging user communications for the session with a communication device of the plurality of communication devices registered as the enterprise node using the routing identifier.

3. The method of claim 1 wherein identifying the routing identifier associated with the enterprise node comprises processing registration information associating a plurality of routing identifiers with the plurality of network handles to determine which one of the plurality of routing identifiers is associated with the first network handle.

4. The method of claim 1 wherein identifying the routing identifier associated with the enterprise node comprises selecting a second network handle that identifies a second position in the enterprise hierarchy and processing registration information associating a plurality of routing identifiers with the plurality of network handles to determine which one of the plurality of routing identifiers is associated with the second network handle.

5. The method of claim 1 wherein the request to establish the session comprises session signaling generated and transferred by another communication device registered as the participant node to initiate the session with the first enterprise node.

6. The method of claim 1 wherein the request to establish the session comprises session signaling generated and transferred by another communication device registered as a third enterprise node of the plurality of enterprise nodes.

7. The method of claim 6 further comprising generating and transferring the session signaling in response to an extension dialed by a user.

8. The method of claim 1 wherein a first level of the hierarchically organized levels corresponds to a department within the enterprise and a subsequent level corresponds to at least one sub-department of the department.

9. The method of claim 1 further comprising transferring, for display by the participant node, persona information identifying a session participant associated with the enterprise node.

10. The method of claim 1 wherein the communication session comprises at least a one of a voice session, a video session, and a chat session.

11. A communication system comprising:

a first enterprise node of a plurality of enterprise nodes using a plurality of network handles that identify positions in an enterprise hierarchy, wherein the enterprise hierarchy comprises a plurality of hierarchically organized levels within an enterprise and each of the positions are located at one of the plurality of levels, wherein a plurality of communication devices are registered with a peer-to-peer network as the plurality of enterprise nodes, and wherein the peer-to-peer network comprises a plurality of peer nodes and the plurality of peer nodes includes the plurality of enterprise nodes;

the first enterprise node configured to receive a request to establish a session with a participant node and the first enterprise node of the plurality of enterprise nodes using a first network handle of the plurality of network handles that identifies a first position in the enterprise hierarchy, and in response to the request, select for the session a second network handle of the plurality of network handles that identifies a second position in the enterprise hierarchy;

a communication device of the plurality of communication devices registered as a second enterprise node configured to, upon selection of the second handle, establish the session with the participant node.

12. The communication system of claim 11 wherein the request to establish the session comprises session signaling generated and transferred by another communication device registered as the participant node to initiate the session with the first enterprise node.

13. The communication system of claim 12 wherein the participant node is not one of the enterprise nodes.

14. The communication system of claim 11 wherein the request to establish the session comprises session signaling generated and transferred by another communication device registered as a third enterprise node of the plurality of enterprise nodes.

15. The communication system of claim 14 wherein the third enterprise node is configured to generate and transfer the session signaling in response to an extension dialed by a user.

16. The communication system of claim 11 wherein a first level of the hierarchically organized levels corresponds to a department within the enterprise and a subsequent level corresponds to at least one sub-department of the department.

17. The communication system of claim 11 wherein the second enterprise node is further configured to transfer, for display by the participant node, persona information identifying a session participant associated with the second enterprise node.

18. The communication system of claim 11 wherein the communication session comprises at least a one of a voice session, a video session, and a chat session.

19. The communication system of claim 11 wherein the first network handle has a format comprising a local part and a domain.

20. The communication system of claim 19 wherein the second handle has a format comprising a second local part, the local part, and the domain.

* * * * *